United States Patent Office
3,450,344
Patented June 17, 1969

3,450,344
THERMOSTATIC VALVES FOR CONTROLLING THE FLOW OF FLUIDS
James Quinlan O'Brien, 33 Finney Lane, Heald Green, Cheadle, England
Filed Dec. 22, 1966, Ser. No. 604,003
Claims priority, application Great Britain, Jan. 4, 1966, 214/66
Int. Cl. G05d 23/10; F03g 7/06; H01h 37/54
U.S. Cl. 236—48              9 Claims

ABSTRACT OF THE DISCLOSURE

In a device for moving a control element in accordance with temperature change in a fluid, the control element is mounted by way of corrugated bimetallic strips whose ends are placed in grooves The grooves are elliptical when viewed from the longitudinal axis of the conduit. The strips can be moved relative to the grooves to vary the compression on the strip and consequently the temperature at which the snap action of the bimetallic strip is triggered.

---

This invention relates to a device for effecting movement of a control element resulting from temperature change such for example as a valve plate or electrical contacts, and is especially but not exclusively suitable for use in thermostatic valves for controlling the flow of fluids according to their temperature through pipelines.

According to the present invention there is provided a device for effecting movement of a control element resulting from temperature change, the device comprising a corrugated bimetallic strip with its ends engaged in a groove in a housing and connectible to a control element and being subject to snap action flexing on temperature change.

Also according to the present invention there is provided a thermostatic valve comprising a conduit through which fluid flows, a valve plate within the conduit and movable on to or from a seating in the conduit to prevent or allow fluid flow, and at least one corrugated bimetallic strip disposed across the conduit with its ends engaging in an elliptical groove, in the conduit wall and connected to the valve plate, whereby temperature changes cause snap-action flexing of the strip and consequent movement of the valve plate to closed or open positions.

The invention may be applied to the control of the flow of fluid in central heating systems, whether the fluid be gaseous, vaporous, or liquid, but is also applicable to the control of the flow of all fluids and fluidised materials, for example powder carried in an air stream, through change in their temperature.

Embodiments of the present invention will now be described, by way of example, with reference to the accompanying drawings, in which.

Figure 1:
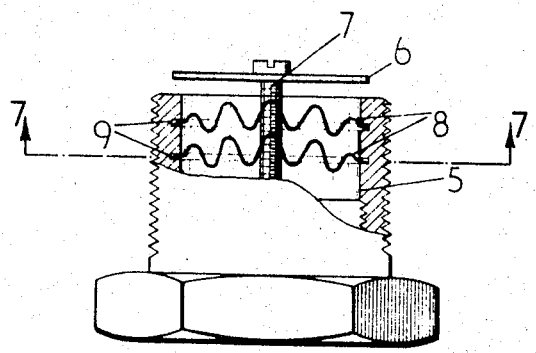
FIG. 1 is an elevational view in partial section of a union suitable for use in a hot water radiator of a central heating system, showing the valve in open position.
Figure 2:
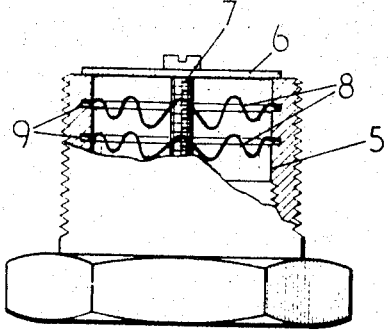
FIG. 2 is an elevational view in partial section corresponding to FIG. 1 with the valve in the closed position.

In carrying out the invention as applied to hot water force-feed small-bore central heating installations with radiators linked in parallel, there is provided at the venting exit of the flow channel of each radiator, or in the bore of a pipe union 5 as shown in FIGS. 1 and 2 at the venting exit of each radiator, a valve mechanism comprising a valve plate 6 secured by a screwed rod 7 to two bimetallic strips 8 of corrugated configuration. The ends of each strip 8 engage in elliptical grooves 9 formed in the bore of the conduit, the union 5, or a sleeve within either.

The bimetallic strips 8 are selected with appropriate thermostatic characteristics, and physical characteristics, such for example as resistance to corrosion and resiliency, and are of suitable width.

Figure 7:
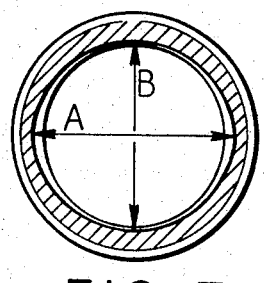
FIG. 7 is a section taken along section line 7–7 in FIG. 1.

The elliptical grooves 9 lie in places normal to the longitudinal axis of the conduit, the union 5, or a sleeve within the conduit or union bore, viz., when viewed along the longitudinal axis of the conduit, the groove 9 defines an ellipse having a major axis A and minor axis B (see FIG. 7).

The width of the strips 8 is in a plane at right angles to and facing the axis of flow.

The grooves 9 are disposed in a section of the flow channel from the radiator, in the present instance in the union 5, where the cross-sectional area is at least equal to the sum of the plan area of a single strip 8 plus the minimum required cross-sectional area of flow of the circulatory system.

The strips 8 are aligned one with the other separately in their grooves 9 and are firmly interconnected at their centres by the rod 7 fixed to the valve plate 6. The grooves 9 are so located and the rod 7 is of such length that the valve plate 6 in the open position lies within an adjacent larger cross-sectional area of the flow channel (not shown), and in the closed position abuts or lies within the union. The cross-sectional area of the larger section of the flow channel in which the valve plate 6 moves, less the plane area of the valve plate 6 as seen facing the flow, is designed to exceed that of the minimum required cross-sectional area of flow of the circulatory system. The surface-cylindrical area traversed by the periphery of the valve plate 6 in its movement, is also designed to exceed that of the minimum required cross-sectional area of flow of the circulatory system.

The configuration of each strip 8 is such that the distance along the longitudinal axis between its ends exceeds the major diameter of its elliptical groove by an amount such that the strips 8, separately located in their grooves 9, each are flexed at their centre from their normal configuration in the plane of their grooves 9. The elliptical grooves 9 are so arranged and are spaced sufficiently apart that the corrugated strips 8 do not foul each other when their curvature is concurrently reversed by flexing.

Figure 3:
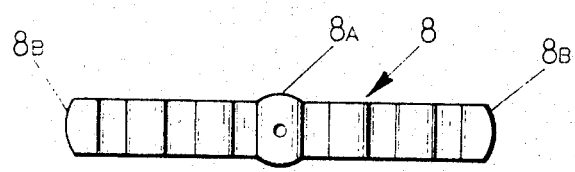
FIGS. 3 and 4 are respectively plan and side views of a corrugated bimetallic strip.
Figure 4:
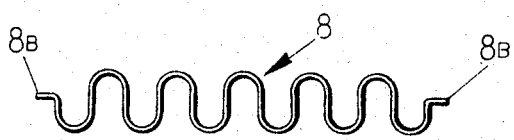

Each strip 8 is wider in the area of its central fixing hole, the outer periphery being an arc generated by a radius around the centre of that hole (where the plan area of the strip permits this width may be exceeded) as indicated at 8A; and is radiussed at each end as indicated at 8B to that of the major radius of the elliptical groove 9 within which it engages (see FIGS. 3 and 4). The plan area of each strip 8 is such that it does not exceed the difference in cross-sectional area of that portion of the flow channel in which it is located and the minimum required cross-sectional area of flow of the circulatory system.

The bimetal material is selected according to the temperatures between which control of the flow of the fluid is required in accordance with known data.

The bimetal characteristics, length and corrugated configuration of each strip 8, and its inherent resiliency are designed so that under the restraint of its housing groove, the stresses generated within the bimetal from temperature change are absorbed as strains within the resiliency of the strip's corrugations, until on overcoming the strip's resistance within the groove to reversal of the curvature, release is effected in one movement at the design temperature in reversal of strip curvature.

The configuration of each corrugated strip 8 is such that the crests or troughs of the corrugations in side view (see FIG. 4) would lie in a straight plane at the mean of the designed strip reversal temperatures.

The low expansion side of each bimetallic strip 8 is directed against the direction of hot water flow in convex form, or alternatively the high expansion side of the bimetallic strip 8 against the direction of hot water flow in concave form, at temperatures below that of strip curvature reversal.

The adjustment of alignment of the strips 8 so that their ends 8B, housed in the elliptical grooves 9, move towards the apogee or the perigee of the groove, varies their compression within the grooves and thus the temperature or temperatures at which strip curvature reversal takes place.

The difference in diameter of the apogee and perigee of each groove 9, in a half-inch bore circulatory system, is of the order of twenty thousandths of an inch.

A plurality of strips is preferably employed to multiply the force operating the valve actuating rod 7 and to control the linearity of movement of the rod. However it will be manifest that only one strip need be employed.

The valve plate 6 may be of thermostatic bimetal in the form of a snap-action dished disc where additional or varied linear movement of the valve is required at the same or other preselected temperatures.

Where the temperature range within which strip reversal occurs is to be small, this may be effected by arresting strip reversal short of the plane of its groove by providing a groove configuration which enforces further compression of the strip when it attempts to pass through the plane of the groove, or by providing a stop in the bore of the union, to arrest rod movement short of the strip's passage through the plane of its groove.

Figure 5:
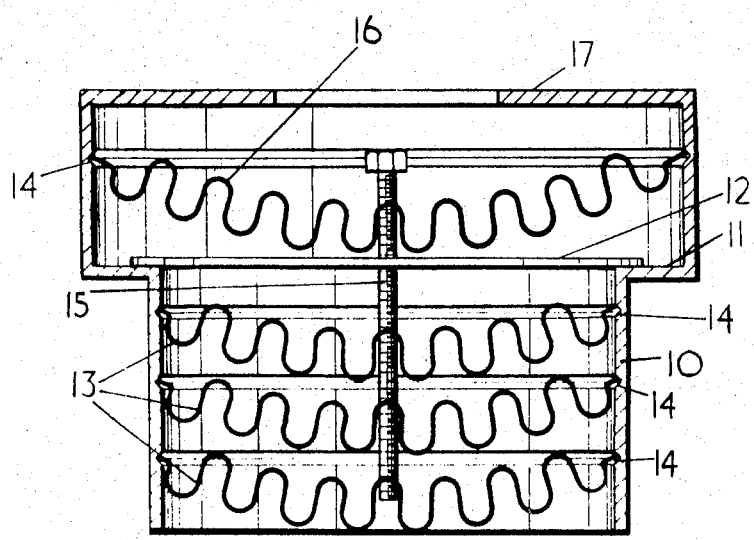
FIGS. 5 and 6 are respectively diagrammatic elevational views in section of a modified thermostatic valve in closed and open positions.
Figure 6:
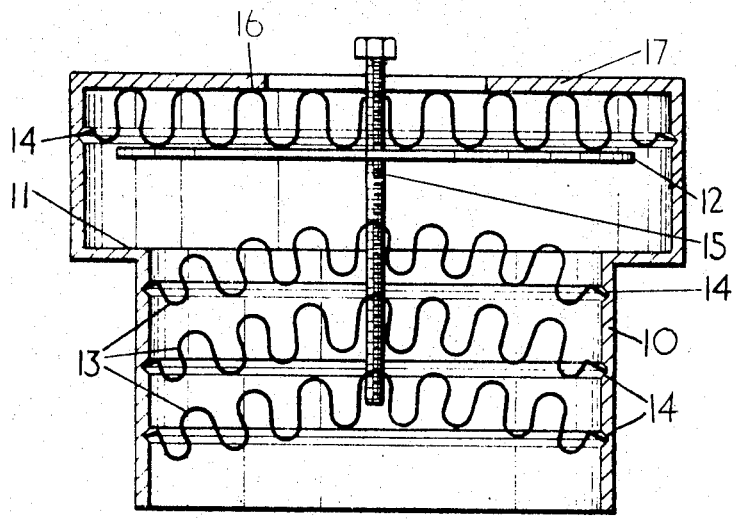

An alternative method of effecting this is illustrated in FIGS. 5 and 6 in which there is shown a valve comprising a housing 10 providing a valve seat 11 on which engages a valve plate 12. Three corrugated bimetallic strips 13 engaging in elliptical grooves 14 are connected to the valve plate 12 by a threaded rod 15. A further corrugated bimetallic strip 16 engaging in an elliptical groove 14 is arranged on the upper side of valve plate 12 but is completely free of the rod 15 which passes through it. Although only one such strip 16 is provided in this example, more than one such strip, each separated from the other by a bush free running on rod 15 may be used.

The strip 16 is designed to reverse curvature in snap action within its groove, as also are the three strips 13, at the valve opening temperature, from the positions shown in FIG. 5. The strip 16 is however, restrained from moving through the plane of its groove 14 by the abutment of the upper strip surface with the top 17 of the valve housing 10, as shown in FIG. 6. Additional strips 16, if provided, are similarly restrtained by the bushes which separate them from the uppermost strip 16. The movement of strips 13 through the planes of their grooves however continues unhindered towards reversal of strip curvature and to completion of valve opening, FIG. 6.

On the temperature of the fluid falling below the opening temperature valve, the strip 16 will, due to the resiliency of the compressed corrugations, immediately seek to flex into the position shown in FIG. 5, from the position shown in FIG. 6, and in so doing will exert force on the upper face of the valve plate 12, which through rod 15, assists the compression within their grooves of the strips 13 from the position shown in FIG. 6 towards the position shown in FIG. 5.

The strip 16, is as aforesaid, loose on the threaded rod 15, and in the present arrangement exerts pressure on the valve plate 12 only on the first half of its travel from the open position towards the closed position. It is left behind in the second half of the valve plate's travel, being retained within its groove 14.

It will be manifest that the corrugated bimetallic strip 16 may alternatively be arranged to assist the initial opening of the valve plate 12 rather than its initial closing movement as shown.

The rod 7 or 15 may have a smooth surface with the corrugated bimetallic strips 8 or 13 secured thereto by, for example, spot welding.

While the principle of employing a corrugated bimetallic strip with its ends housed in a groove has been described above with particular reference to thermostatic fluid flow control valves, it will be manifest that it can be employed to effect movement of any control element on temperature change such for example as electrical contacts.

What is claimed is:

1. A device for moving a control element in accordance with temperature change, comprising a housing having a passage through it defining a conduit; at least one groove in the wall of said conduit, said groove being elliptical when viewed from the longitudinal axis of said conduit and having a major and minor axis; and at least one corrugated bimetallic strip mounted in said groove for snap action, its center being connected to a control element, said strip being of a configuration such that it may be adjusted between the major and minor axes of said elliptical groove to vary the compression of said strip and consequently the temperature at which the snap action occurs.

2. A device as claimed in claim 1 wherein the ends of said strip have a shape commensurate with the major radius of said elliptical groove within which it is mounted.

3. A device as claimed in claim 1, comprising a plurality of elliptical grooves and a plurality of corrugated bimetallic strips, one for each groove.

4. A thermostatic valve for controlling fluid flow comprising in combination with said device of claim 1, the control element is connected to the center of said strip; and a valve plate attached to one end of said control element to be moved to and from a seating by said strip for preventing or allowing fluid to pass through said conduit.

5. A thermostatic valve as claimed in claim 4, in which an additional bimetallic strip is associated with said valve plate without being connected to said control element to assist the initial closing or opening movement of said valve plate.

6. A thermostatic valve as claimed in claim 4, in which said conduit is a union for use in a hot water supply system.

7. A thermostatic valve as claimed in claim 4, in which a plurality of corrugated bimetallic strips are connected to said control element, the ends of each strip engaging in a separate elliptical groove.

8. A thermostatic valve as claimed in claim 7, in which the elliptical grooves concentrically overlap one another.

9. A thermostatic valve as claimed in claim 7 wherein said valve plate and seating are within said conduit, said seating being a transition area in said conduit where a portion of one diameter is connected to a portion of greater diameter; said strips all being on one side of said valve plate; an additional corrugated bimetallic strip mounted in an elliptical groove on the other side of said valve plate and movable relative to said control element such as to assist the initial closing of said valve plate.

References Cited

UNITED STATES PATENTS

| | | | |
|---|---|---|---|
| 1,600,322 | 9/1926 | Davis | 73—378.3 |
| 1,983,823 | 12/1934 | Spencer | 200—139 X |
| 2,361,193 | 10/1944 | Gray | 200—139 X |
| 2,461,904 | 2/1949 | Vaughan | 236—48 X |
| 2,469,217 | 5/1949 | Sway | 73—378.3 X |

ROBERT A. O'LEARY, *Primary Examiner.*

W. E. WAYNER, *Assistant Examiner.*

U.S. Cl. X.R.

60—23; 236—93; 337—368